United States Patent [19]

Nakamura et al.

[11] Patent Number: 4,625,822
[45] Date of Patent: Dec. 2, 1986

[54] REAR WHEEL STEERING CONTROL FOR VEHICLE

[75] Inventors: Kenji Nakamura; Yasuji Shibahata, both of Yokohama; Yukio Fukunaga, Zushi; Yasumasa Tsubota, Yokosuka; Namio Irie; Junsuke Kuroki, both of Yokohama, all of Japan

[73] Assignee: Nissan Motor Co., Ltd., Yokohama, Japan

[21] Appl. No.: 703,593

[22] Filed: Feb. 20, 1985

[30] Foreign Application Priority Data

Feb. 22, 1984 [JP] Japan ................................. 59-30144

[51] Int. Cl.⁴ ............................................. B62D 15/00
[52] U.S. Cl. ..................................... 180/140; 180/142
[58] Field of Search ................. 180/79.1, 140, 141, 180/142, 143, 234, 236, 131; 364/424, 425

[56] References Cited

U.S. PATENT DOCUMENTS 3,933,215 1/1976 Scheuerle ...................... 180/79.1 X
4,399,884 8/1983 Vandehey ........................... 180/79.1
4,412,594 11/1983 Furukawa et al. ............. 180/142 X
4,418,780 12/1983 Ito et al. ................................ 180/142

FOREIGN PATENT DOCUMENTS

734049 5/1980 U.S.S.R. ............................... 180/140
738927 6/1980 U.S.S.R. ............................... 180/236

Primary Examiner—John J. Love
Assistant Examiner—Charles R. Watts
Attorney, Agent, or Firm—Leydig, Voit & Mayer

[57] ABSTRACT

A rear wheel steering control system which determines a target rear wheel steering angle in accordance with a steering angle of front wheels of the vehicle and steers the rear wheels so that the rear wheel steering angle is maintained equal to the target rear wheel steering angle, and is arranged not to decrease the difference between the target angle and the actual rear wheel steering angle immediately to zero, but to decrease the difference gradually in accordance with a distance traveled by the vehicle, in order to prevent the rear wheels from being steered too much in a direction opposite to a steered direction of the front wheels especially when the vehicle speed is low, and thereby prevent the rear of the vehicle from bumping against an object lying alongside the vehicle.

13 Claims, 8 Drawing Figures

REAR WHEEL STEERING CONTROL FOR VEHICLE

BACKGROUND OF THE INVENTION

The present invention relates to a system and method for steering a wheeled vehicle such as an automobile, and more specifically to a rear wheel steering control system and method which are arranged to reduce the steering amount of rear wheels especially when vehicle speed is low.

A rear wheel steering system of a conventional type is arranged to steer the rear wheels a large amount in a direction opposite to the direction in which the front wheels are steered in order to reduce the turning radius of the vehicle when the vehicle speed is low or when the steering amount of the front wheels is large, and to steer the rear wheels to a relatively small extent in the same direction as the front wheels in order to improve the direction control and stability of the vehicle when the vehicle speed is high or when the steering amount of the front wheels is small. In this system, if the front wheels are steered in order to move the vehicle out of a narrow parking space while the vehicle speed is low or zero, then the rear wheels are also steered in the opposite direction to the steered direction of the front wheels. Accordingly, the outside rear wheel moves outwardly along a solid line curve shown in FIG. 1 in contrast with a broken line curve obtained when the rear wheels are not steerable, and therefore the rear of the vehicle may bump against an adjacent object such as a side wall of a garage or a next automobile.

SUMMARY OF THE INVENTION

It is an object of the present invention to provide a rear wheel steering control system and method for preventing the rear end of a vehicle from moving outwardly especially when the steering amount of the front wheels is large and the vehicle speed is low.

According to the present invention, a vehicle comprises a pair of front wheels, a pair of rear wheels, front wheel steering means capable of altering a front wheel steering angle, and rear wheel steering means, which determines a target rear wheel steering angle in accordance with the front wheel steering angle and steers the rear wheels so that a difference between a rear wheel steering angle and the target rear wheel steering angle is decreased gradually in accordance with a distance travelled by the vehicle.

A rear wheel steering control method according to the present invention comprises the steps of determining a target rear wheel steering angle in accordance with a front wheel steering angle, and steering the rear wheels so that a difference between a rear wheel steering angle and the target rear wheel steering angle is decreased gradually in accordance with a distance travelled by the vehicle.

DEAILED DESCRIPTION OF THE INVENTION

Figure 2:
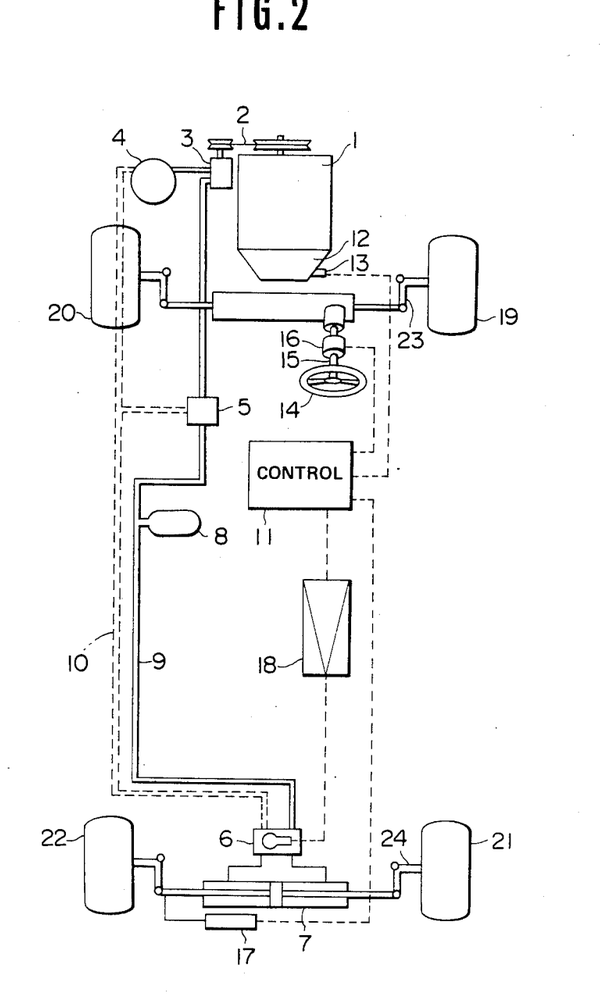
FIG. 2 is a schematic plan view of a rear wheel steering system used for the present invention.

FIG. 2 shows a rear wheel steering system which can be used for the present invention.

An engine 1 of a motor vehicle drives an oil pump 3 through an arrangement 2 having a belt and pulleys. The oil pump 3 sends oil from a reservoir tank 4 through an unloading valve 5 to a servo valve 6, which can supply the oil to either of right and left fluid chambers of a rear wheel steering hydraulic actuator 7. An accumulator 8 is provided in a supply conduit 9 for conveying the oil to the servo valve 6. A return conduit 10 conveys the oil from the servo valve 6 to the reservoir tank 4.

An electronic control circuit 11 receives a vehicle speed signal from a vehicle speed sensor 13 disposed in a transmission 12 of the vehicle, a front wheel steering angle signal from a front wheel steering angle sensor 16 disposed in a steering column 15 of a steering wheel 14, and a rear wheel steering angle signal from a rear wheel steering angle sensor 17. In accordance with an output signal of the control circuit 11, a servo amplifier 18 actuates the servo valve 6 by sending an electric signal thereto.

Right and left front road wheels 19 and 20 can be steered by front steering linkages 23, and right and left rear road wheels 21 and 22 can be steered by rear steering linkages 24.

Figure 3:
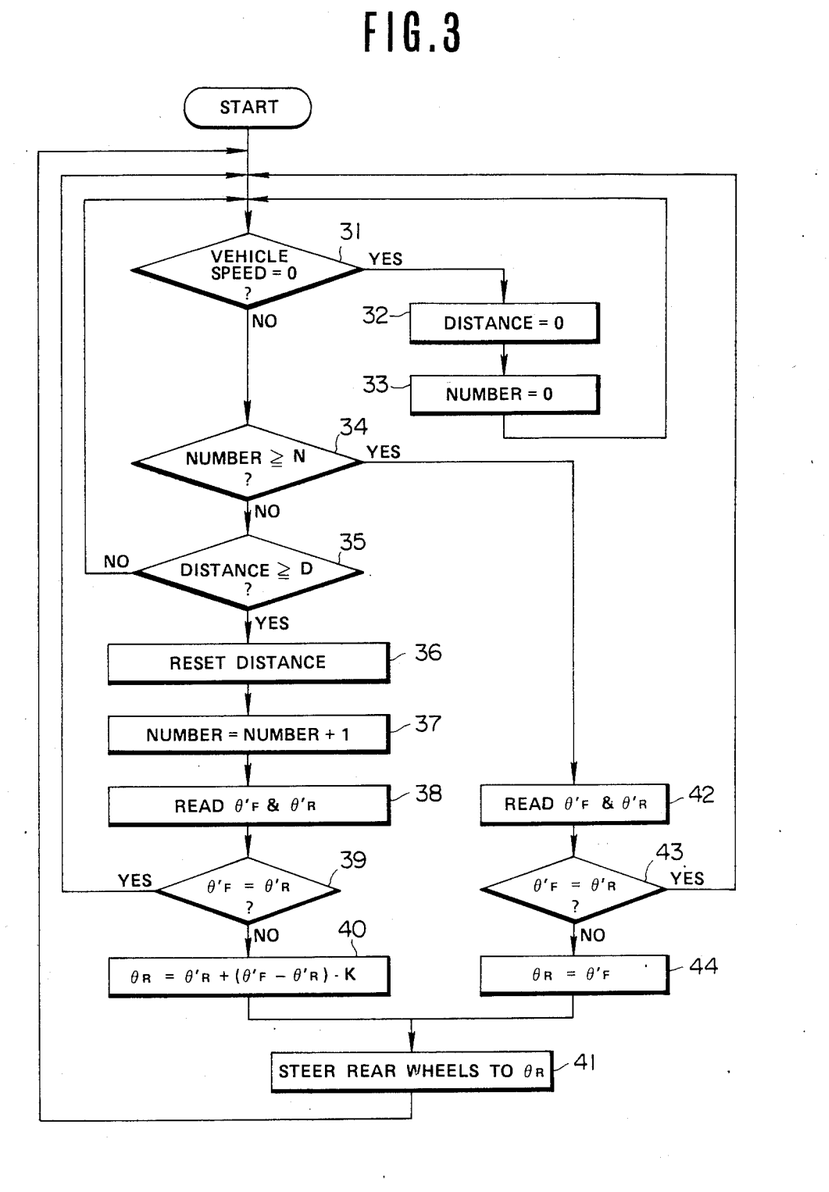
FIG. 3 is a flowchart of a program of a first embodiment of the present invention.

A first embodiment of the present invention is shown in FIG. 3. In the first embodiment, the rear wheel steering angle through which the rear wheels are steered in a direction opposite to a steered direction of the front wheels is made closer to the front wheel steering angle in a stepwise manner each time the vehicle travels a predetermined constant distance, and the ratio of the rear wheel steering angle in the opposite direction to the front wheel steering angle is made equal to one after the vehicle has travelled a predetermined total distance which is a multiple of the constant distance.

Figure 1:
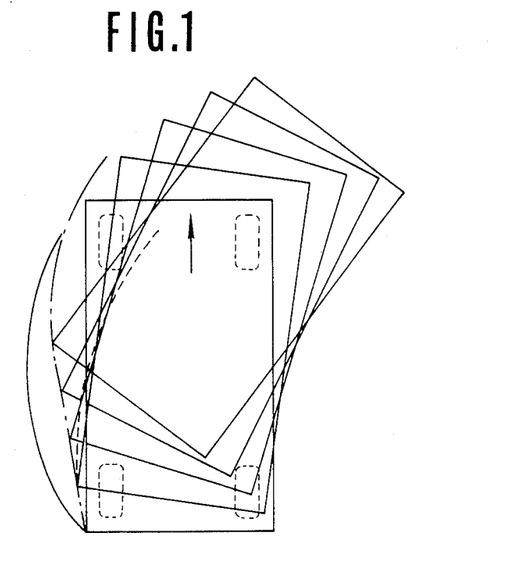
FIG. 1 is a schematic plan view showing paths of an outside rear wheel of a vehicle.
Figure 4:
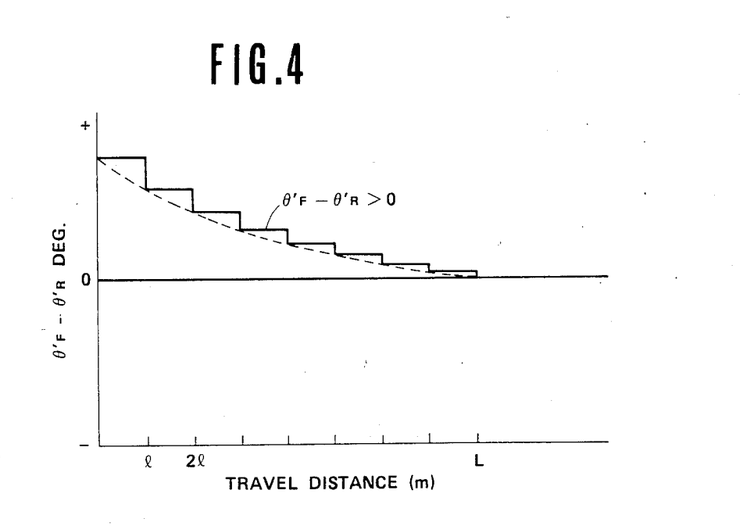
FIG. 4 is a diagram showing a control action of the first embodiment.

In this embodiment, the control unit 11 measures a distance travelled by the vehicle by counting pulses produced by the vehicle speed sensor 13. The count for measuring the distance travelled by the vehicle is represented by DISTANCE in the flowchart of FIG. 3. First, the control unit 11 determines whether the vehicle is at rest or moving, at a step 31. If the vehicle is not moving, the control unit 11 makes DISTANCE equal to zero at a step 32, and makes NUMBER representing an integer equal to zero at a step 33. Then, the control unit 11 repeats the step 31. If the vehicle is moving, the control unit 11 determines whether NUMBER is equal to or greater than a predetermined positive integer N, at a step 34. If NUMBER is smaller than N, the control unit 11 determines whether DISTANCE is equal to or greater than a predetermined number D which is smaller than N, at a step 35. If DISTANCE is smaller than D, the control unit 11 returns to the step 31. If DISTANCE is equal to or greater than D, the control unit 11 reset a counting means for counting DIS- TANCE to a prescribed state at a step 36. For example, the control unit 11 clears DISTANCE to zero, or subtracts D from DISTANCE at the step 36. Then, the control unit 11 increases NUMBER by one at a step 37. Thus, the control unit 11 increments NUMBER each time the vehicle travels a predetermined constant distance represented by D. After the step 37, the control unit 11 reads an actual front wheel steering angle $\theta'_F$ and an actual rear wheel steering angle $\theta'_R$, at a step 38. For example, the step 38 is performed by converting analog voltage signals produced by the front and rear wheel steering angle sensors 16 and 17 into digital signals, respectively, and inputting the thus-obtained digital signals into the control unit 11. After the step 38, the control unit 11 determines whether the actual rear wheel steering angle $\theta'_R$ is equal to the actual front wheel steering angle $\theta'_F$, at a step 39. If it is, the control unit 11 returns to the step 31 without steering the rear wheels. If it is not, the control unit 11 calculates a desired rear wheel steering angle $\theta'_R$, at a step 40, from;

$$\theta_R = \theta'_R + (\theta'_F - \theta'_R) \times K \tag{1}$$

where K is a predetermined constant ($0 < K \leq 1$). Then, at a step 41, the control unit 11 produces an output signal to command the servo valve 6 to make the actual rear wheel steering angle $\theta'_R$ equal to the desired rear wheel steering angle $\theta_R$ calculated at the step 40. In accordance with the output signal of the control unit 11, the servo valve 6 steers the rear wheels by actuating the rear wheel steering actuator 7, and makes the actual rear wheel steering angle equal to the desired rear wheel steering angle $\theta_R$. Then, the control unit 11 repeats the steps 31 and 34 to 41 until the actual rear wheel steering angle becomes equal to the actual front wheel steering angle. As shown in FIG. 4, the actual rear wheel steering angle $\theta'_R$ approaches the actual front wheel steering angle $\theta'_F$ in a stepwise manner each time the vehicle travels the constant distance 1 corresponding to D. The difference between the actual front and rear wheel steering angles becomes zero when the vehicle travels a predetermined total distance L. Therefore, the rear wheel steering system of the present invention prevents the rear wheels from moving along the solid line in FIG. 1, and instead makes the rear wheels move along a one-dot chain line in FIG. 1

If the control unit 11 recongnizes, at the step 34, that NUMBER is equal to or greater than N, the control unit 11 reads the actual front and rear wheel steering angles $\theta'_F$ and $\theta'_R$ at a step 42, and then compares both angles with each other at a step 43. If the actual rear wheel steering angle is equal to the actual front wheel steering angle, the control unit 11 returns to the step 31. If the actual rear wheel steering angle is not equal to the actual front wheel steering angle, the control unit 11 makes the desired rear wheel steering angle $\theta_R$ equal to the actual front wheel steering angle, at a step 44, and at the step 41, commands the servo valve 6 to steer the rear wheels so as to make the actual rear wheel steering angle equal to the desired rear wheel steering angle calculated at the step 44.

It is optional to insert the step 34 between the steps 39 and 40 instead of the position between the steps 31 and 35, and remove the steps 42 and 43. In this case, the control unit 11 proceeds directly to the step 44 if the answer of the step 33 is affirmative, and proceeds to the step 40 if the answer is negative.

It is optional to remove the steps 31–34, 37 and 42–44 from the program of FIG. 3, and perform the rear wheel steering control of FIG. 3 without using NUMBER.

In the program of FIG. 3, a correction quantity $(\theta'_F - \theta'_R) \cdot K$ is decreased as the difference $\theta'_F - \theta'_R$ decreases. However, it is optional to make the correction quantity constant. In this case, the rear wheel steering angle is increased by a constant amount each time the vehicle travels the constant distance.

This control system can control the rear wheel steering angle even if the rear wheels are out of the straight ahead position and steered in the opposite direction or the same direction in relation to the front wheels at an initial state such as when the vehicle is at rest.

Figure 5:
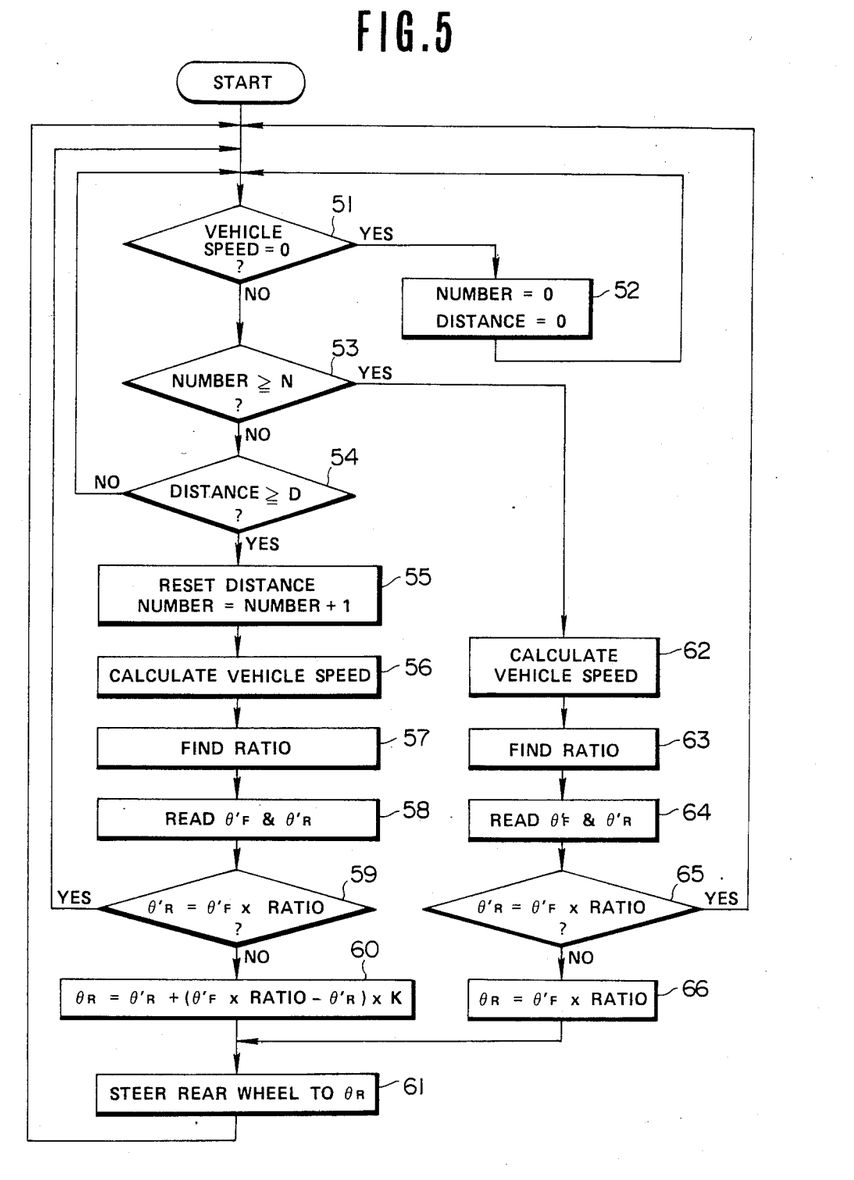
FIG. 5 is a flowchart of a program of a second embodiment of the present invention.
Figure 6:
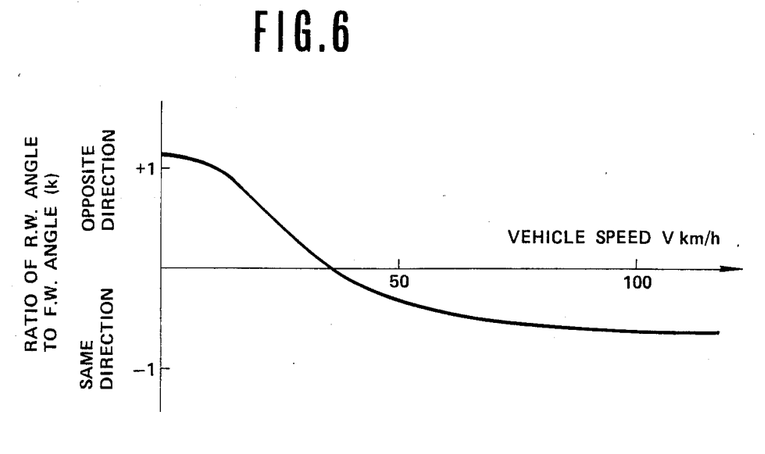
FIG. 6 is a diagram showing a functional relationship between a rear/front wheel steering angle ratio to reduce a lateral slip of the vehicle, and a vehicle speed.

A second embodiment of the present invention is shown in FIG. 5. In the second embodiment, the ratio of the rear wheel steering angle to the front wheel steering angle is varied as a function of the vehicle speed, so as to eliminate a lateral slip angle of the vehicle. It is important for the direction control and stability of a vehicle to reduce a lateral slip angle of the center of gravity of the vehicle during a turn of the vehicle to zero. A U.S. Pat. No. 4,418,780 (corresponding to Japanese Patent provisional publication No. 57-11173) discloses a rear wheel steering system designed to reduce the lateral slip angle of a vehicle equal to zero. In this system, a ratio k of the rear wheel steering angle $\theta_R$ to the front wheel steering angle $\theta_F$ is varied in accordance with the vehicle speed as shown in FIG. 6. As shown in FIG. 6, the rear wheels are steered in the direction opposite to the direction in which the front wheels are steered, when the vehicle speed is low, and the ratio of the rear wheel steering angle in the opposite direction, to the front wheel steering angle is increased as the vehicle speed decreases. The rear wheels are steered in the same direction as the front wheels are steered when the vehicle speed is high, and the ratio of the rear wheel steering angle in the same direction, to the front wheel steering angle is increased as the vehicle speed increases. Accordingly, the rear wheel steering system of this reference tends to steer the rear wheels to a large angle when the front wheels are steered at low vehicle speeds immediately after the vehicle starts moving, so that the outside rear wheel tend to move along the solid line in FIG. 1.

In the program of the second embodiment shown in FIG. 5, the control unit 11 first performs steps 51, 52, 53, 54 and 55 which correspond to the steps 31–37 of FIG. 3, in the same manner as in the first embodiment. If the control unit 11 decides, at the step 54, that DISTANCE is equal to or greater than D, the control unit 11 calculates the vehicle speed at a step 56 after the step 55. The step 56 is performed by counting the pulses produced by the vehicle speed sensor 13 within a predetermined time interval, or measuring the pulse spacing of the pulses of the vehicle speed sensor 13. After the step 56, the control unit 11 determines RATIO which is the ratio of the rear wheel steering angle to the front wheel steering angle determined to reduce the lateral slip angle of the vehicle to zero. For example, the control unit 11 stores a table of values of the ratio of the rear wheel steering angle to the front wheel steering angle, determined as shown in FIG. 6, and obtains the value of the ratio that corresponds to the vehicle speed calculated at the step 56 from the table.

Then, the control unit 11 reads the actual front and rear wheel steering angle $\theta'_F$ and $\theta'_R$ at a step 58, and determines whether the actual rear wheel steering angle is equal to the product of the actual front wheel steering angle and RATIO, at a step 59. That is, the control unit 11 determines whether the actual front and rear wheel steering angles satisfy the following equation;

$$\theta'_R = \theta'_F \times \text{RATIO} \qquad (2)$$

If the answer of the step 59 is negative, the control unit 11 proceeds to a step 60, where the control unit 11 calculates the desired rear wheel steering angle $\theta_R$ from;

$$\theta_R = \theta'_R + (\theta'_F \times \text{RATIO} - \theta'_R) \times K \qquad (3)$$

where K is a predetermined constant ($0 < K \leq 1$).

The control unit 11, at a step 61, produces the output signal indicative of the desired rear wheel steering angle $\theta'_R$ calculated at the step 60. In accordance with the output signal of the control unit 11, the servo valve 6 steers the rear wheels so as to make the actual rear wheel steering angle equal to the desired rear wheel steering angle $\theta'_R$ by actuating the rear wheel steering actuator 7.

The time required for the vehicle to travel the constant distance becomes shorter with increase of the vehicle speed. Therefore, the response of the rear wheel steering becomes speedier with increase of the vehicle speed in both of the first and second embodiments.

It is optional to remove the steps 51-53 and 62-66 from the program of FIG. 5, and perform the program without using NUMBER.

Figure 7:
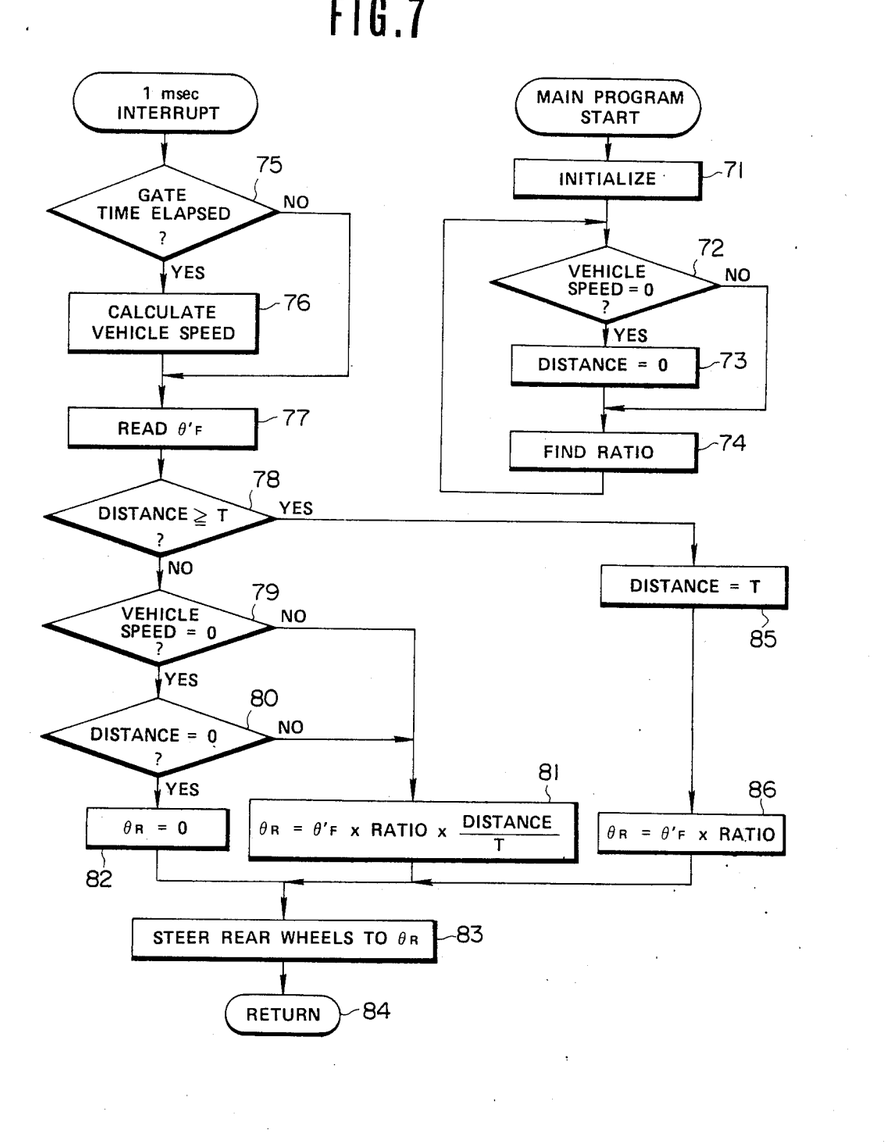
FIG. 7 is a flowchart of a program of a third embodiment of the present invention.

A third embodiment of the present invention is shown in FIG. 7. In the third embodiment, the rear wheel steering control is performed by the use of an interrupt subroutine which is started each time a predetermined time interval (1 msec, for example) has elapsed, and the rear wheels are steered to a neutral or straight ahead position when the vehicle comes to a stop.

As shown in FIG. 7, according to a main program, the control unit 11 first performs an initialization at a step 71, and then determines, at a step 72, whether the vehicle speed is equal to zero or not. If the vehicle speed is equal to zero, the control unit 11 makes DISTANCE equal to zero at a step 73, and proceeds to a next step 74, where the control unit 11 finds RATIO which is the ratio of the rear wheel steering angle to the front wheel steering angle, dependent on the vehicle speed, in the same manner as the step 57 of FIG. 5. If the vehicle speed is not equal to zero, the control unit 11 proceeds directly to the step 74. After the step 74, the control unit 11 repeats the steps 72 to 74.

The control unit 11 enters an interrupt subroutine each time. a predetermined time interval (for example, 1 milisecond) has elapsed. In the interrupt subroutine, the control unit 11 determines whether a predetermined gate time (interval) required for determining the vehicle speed, has elapsed from the start of the interrupt subroutine. If the answer of the step 75 is affirmative, the control unit 11 determines the vehicle speed by counting the pulses produced by the vehicle speed sensor 13, for example, at a step 76, and reads the actual front wheel steering angle $\theta'_F$ at a step 77. If the answer of the step 75 is negative, the control unit 11 proceeds to the step 77 bypassing the step 76. After the step 77, the control unit 11 determines whether DISTANCE is equal to or greater than a predetermined number T, at a step 78.

If DISTANCE is smaller than T, the control unit 11 determines whether the vehicle speed is equal to zero, at a step 79. If the vehicle speed is zero, the control unit 11 further determines whether DISTANCE is equal to zero, at a step 80.

If either the vehicle speed or DISTANCE is not equal to zero, the control unit 11 calculates the desired rear wheel steering angle $\theta'_R$, at a step 81, from $$\theta_R = \theta_{F'} \times \text{RATIO} \times \frac{\text{DISTANCE}}{T} \qquad (4)$$

At a next step 83, the control unit 11 commands the servo valve 6 to steer the rear wheels so that the actual rear wheel steering angle becomes equal to the desired rear wheel steering angle calculated at the step 81.

If both of the vehicle speed and DISTANCE are equal to zero, the control unit 11 sets the desired rear wheel steering angle equal to zero, at a step 82, and commands the servo valve 6 to return the rear wheels to the neutral or straight ahead position at the step 83. Thus, the control unit 11 of the third embodiment holds the rear wheels in the neutral position when the vehicle is at rest, so that the control unit 11 can prevent an outward movement of the rear wheels sufficiently whether the front wheels are steered to the right or left in restarting the vehicle. The step 80 is required in addition to the step 79 for determining whether the vehicle is at rest, because, if the step 76 is bypassed, the vehicle speed remains zero while the vehicle starts moving.

If DISTANCE is equal to or greater than T, the control unit 11 sets DISTANCE equal to T, at a step 85, and then calculates the desired rear wheel steering angle $\theta'_R$, at a step 86, from:

$$\theta'_R = \theta'_F \times \text{RATIO} \qquad (5)$$

Then, at the step 83, the control unit 11 commands the servo valve 6 to steer the rear wheels so that the actual rear wheel steering angle becomes equal to the desired rear wheel steering angle calculated at the step 86. Therefore, the rear wheels are steered in accordance with the characteristic curve of FIG. 6 so that the lateral slip of the vehicle is reduced to zero, after the vehicle has traveled a predetermined total distance corresponding to T.

Figure 8:
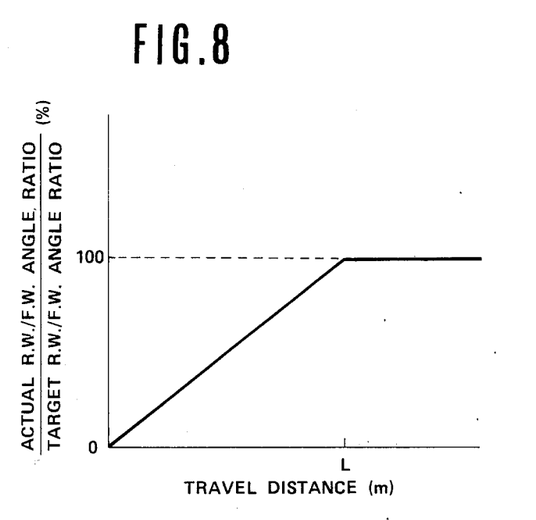
FIG. 8 is a diagram showing a control action of the third embodiment.

Thus, the control unit 11 of the third embodiment varies the actual ratio of the actual rear wheel steering angle to the actual front wheel steering angle toward the target ratio determined by FIG. 6, as shown in FIG. 8. When the vehicle is at rest, that is, the travel distance is zero, the rear wheels are held in the neutral position. Therefore, a quotient of the actual ratio divided by the target ratio is equal to zero. When the vehicle starts moving, the rear wheels are steered in accordance with the equation (4), so that the quotient expressed by percent increases along a straight line toward 100 percent. When the travelled distance reaches L meter, the quotient reaches 100 percent. That is, the actual ratio is made equal to the desired ratio determined by FIG. 6. After that, the quotient is maintained equal to 100 percent.

What is claimed is:

1. A vehicle comprising:
    a pair of front wheels and a pair of rear wheels,
    front wheel steering means for altering a front wheel steering angle, and
    rear wheel steering means including means for measuring distance travelled by the vehicle, means for sensing the front wheel steering angle, means for determining a target rear wheel steering angle equal to the product of the front wheel steering angle and a predetermined ratio, and means for controlling a rear wheel steering angle by steering the rear wheels so that the rear wheel steering angle is maintained equal to the target rear wheel steering angle when the distance measured by the distance measuring means is equal to or greater than a predetermined total distance, and so that the rear wheel sterring angle approaches the target rear wheel steering angle in accordance with distance travelled by the vehicle when the distance measured by the distance measuring means is smaller that the predetermined total distance.

2. A vehicle according to claim 1, wherein the rear wheel steering means decreases the difference each time the vehicle travels a predetermined constant distance.

3. A vehicle according to claim 2, wherein the rear wheel steering means includes means for sensing the rear wheel steering angle.

4. A vehicle according to claim 1, wherein the rear wheel steering means returns the rear wheels to a straight ahead position when the vehicle is at rest.

5. A vehicle according to claim 4, wherein the rear wheel steering means decreases the difference each time a predetermined time interval elapses.

6. A vehicle according to claim 5, wherein the rear wheel steering means comprises means for measuring a distance traveled by the vehicle from a start of a movement of the vehicle, and means for sensing the front wheel steering angle, and wherein, each time the predetermined time interval elapses, the rear wheel steering means reads the front wheel steering angle currently sensed by the front wheel. steering sensing means, determines the target rear wheel steering angle which is equal to the product of the currently sensed front wheel steering angle and the predetermined ratio, determines whether the distance currently measured by the distance measuring means is equal to or greater than a predetermined total distance, makes the rear wheel steering angle equal to the product of the currently determined target rear wheel steering angle and the fraction whose denominator is the predetermined total distance and whose numerator is the currently measured distance if the currently measured distance is smaller than the total distance and at the same time the vehicle is moving, and makes the rear wheel steering angle equal to the currently determined target rear wheel steering angle if the currently measured distance is equal to or greater than the total distance and at the same time the vehicle is moving.

7. A vehicle according to claim 6, wherein the ratio is decreased from a positive value to a negative value as a vehicle speed increases so that the rear wheels tend to be steered in an opposite direction to a steered direction of the front wheels with respect to a longitudinal line of the vehicle in a low vehicle speed range, and in the same direction as the front wheels in a high vehicle speed range.

8. A vehicle comprising:
a pair of steerable front wheels and a pair of steerable rear wheels,
front wheel steering means for altering the front wheel steering angle, and
rear wheel steering means for determining a target rear wheel steering angle equal to the product of the front wheel steering angle and a predetermined ration, and steering the rear wheels so that any difference between a rear wheel steering angle and the target rear wheel steering angle is decreased gradually each time the vehicle travels a predetermined constant distance, means for determining the target rear wheel steering angle by multiplying the sensed front wheel steering angle with the predetermined ratio, and means for making the rear wheel steering angle equal to the sum of the currently sensed rear wheel steering angle and a correction quantity determined by multiplying a predetermined coefficient which is greater than zero and equal to or smaller than one with the difference obtained by subtracting the currently sensed rear wheel steering angle from the determined target rear wheel steering angle.

9. A vehicle according to claim 8 wherein the predetermined coefficient is smaller than one when a distance traveled by the vehicle from a start of a movement of the vehicle is smaller than a predetermined total distance which is greater than the constant distance, and the predetermined coefficient is equal to one when the distance travelled by the vehicle from a start of a movement of the vehicle is greater than the total distance.

10. A vehicle according to claim 8 wherein the predetermined ratio is independent of vehicle speed, and the rear wheels are steered in a direction opposite to a steered direction of the front wheels with respect to a longitudinal line of the vehicle until the difference reaches zero.

11. A vehicle according to claim 8 wherein the ratio is decreased from a positive value to a negative value as a vehicle speed increases so that the rear wheels tend to be steered in an opposite direction to a steered direction of the front wheels with respect to a longitudinal line of the vehicle in a low vehicle speed range, and in the same direction as the front wheels in a high vehicle speed range.

12. A vehicle according to claim 11, wherein, each time the vehicle travels the pre constant distance, the rear wheel steering means measures the current vehicle speed, and determines the value of the ratio corresponding to the current vehicle speed, and determines the target rear wheel steering angle by using the determined value of the ratio.

13. A method for steering rear wheels of a vehicle having steerable front wheels, comprising the steps of:
measuring distance travelled by the vehicle,
sensing the front wheel steering angle,
determining a target rear wheel steering angle equal to the product of the front wheel steering angle and a predetermined ratio, and
controlling a rear wheel steering angle by steering the rear wheels so that the rear wheel steering angle is maintained equal to the target rear wheel steering angle when the distance measured by the distance measuring means is equal to or greater than a predetermined total distance, and so that the rear wheel steering angle approaches the target rear wheel steering angle gradually in accordance with distance travelled by the vehicle when the distance measured by the distance measuring means is smaller than the predetermined total distance.

* * * * *